(12) United States Patent
Hirano et al.

(10) Patent No.: US 12,221,457 B2
(45) Date of Patent: Feb. 11, 2025

(54) BORON-CONTAINING COMPOUND AND METHOD FOR PRODUCING SAME

(71) Applicant: National University Corporation Tokyo University of Agriculture and Technology, Fuchu (JP)

(72) Inventors: Masafumi Hirano, Fuchu (JP); Nobuyuki Komine, Fuchu (JP); Sayori Kiyota, Fuchu (JP); Keita Shimada, Fuchu (JP)

(73) Assignee: NATIONAL UNIVERSITY CORPORATION TOKYO UNIVERSITY OF AGRICULTURE AND TECHNOLOGY, Tokyo (JP)

( * ) Notice: Subject to any disclaimer, the term of this patent is extended or adjusted under 35 U.S.C. 154(b) by 554 days.

(21) Appl. No.: 17/429,103

(22) PCT Filed: Feb. 6, 2020

(86) PCT No.: PCT/JP2020/004682
§ 371 (c)(1),
(2) Date: Aug. 6, 2021

(87) PCT Pub. No.: WO2020/162575
PCT Pub. Date: Aug. 13, 2020

(65) Prior Publication Data
US 2022/0135596 A1 May 5, 2022

(30) Foreign Application Priority Data
Feb. 8, 2019 (JP) .................. 2019-021791

(51) Int. Cl.
*C07F 5/02* (2006.01)
*B01J 23/46* (2006.01)

(52) U.S. Cl.
CPC .............. *C07F 5/025* (2013.01); *B01J 23/462* (2013.01)

(58) Field of Classification Search
CPC ...... C07F 5/025; B01J 23/462; B01J 31/2295; B01J 2231/323; B01J 31/2409; B01J 2231/4211; B01J 2531/821; B01J 2531/845
See application file for complete search history.

(56) References Cited

U.S. PATENT DOCUMENTS

2001/0039349 A1* 11/2001 Hartwig ............... B01J 31/2295
546/250

FOREIGN PATENT DOCUMENTS

CN 105017299 A 11/2015
FR 1536670 A 8/1968

OTHER PUBLICATIONS

Database Registry, 2010 (accession date), RN1225291-96-2, Retrieved from STN international [online]; retrieved on Apr. 6, 1 page.
Database Registry, 2016 (accession date), RN 2035513-51-8, Retrieved from STN international [online] ;retrieved on Apr. 6, 1 page.
Database Registry, 2017 (accession date), RN 2155825-83-3, Retrieved from STN international [online] ;retrieved on Apr. 6, 1 page.
Altenhofer, E et al., "Radical isomerization of borylated allylic sulfones", Tetrahedron Letters, vol. 56, No. 23, 2015, pp. 3176-3178.
Arndt, M et al., "Gaining Absolute Control of the Regiochemistry in the Cobalt-Catalyzed 1,4-Hydrovinylation Reaction", Organic Letters, vol. 13, No. 23, 2011, Dated, Oct. 7, 2011; pp. 6236-6239.
Hetzler, B.E et al., "A Versatile Bis-Allylboron Reagent for the Stereoselective Synthesis of Chiral Diols", Angew. Chem. Int. Ed., vol. 57, 2018; pp. 14276-14280.
Hilt, G. "Asymmetric Nickel-Catalysed Cross-Hydrovinylation of Two Terminal Alkenes", ChemCatChem, 2015, vol. 7, 2015; pp. 1639-1641.
Hirano, M et al. "Catalytic cross-dimerisation giving reactive borylated polyenes toward cross-coupling", Chemical Communications, vol. 55, 2019, pp. 10527-10530.
Hirano M. et al., "Cross-Dimerization of 2,5-Dihydrofuran with Conjugated Dienes Catalyzed by (Chiral Diene) ruthenium(0) Complexes and Origins of the Enantioselectivity", Organometallics, 2021, pp. A-R.
Jung, B. et al., "Site- and Enantioselective Formation of Allene-Bearing Tertiary or Quaternary Carbon Stereogenic Centers through NHC-Cu-Catalyzed Allylic Substitution", JACS Publications, vol. 134, 2012; pp. 1490-1493.
Kuramochi, A. et al., "Ru(0)-Catalyzed Synthesis of Borylated-Conjugated Triene Building Blocks by Cross-Dimerization and Their Use in Cross-Coupling Reactions", Bulletin of the Chemical Society of Japan, Jun. 19, 2021, 19 pages.
Nishihara, Y. et al., "Synthesis of Cyclic 1-Alkenylboronates via Zr-Mediated Double Functionalization of Alkynylboronates and Sequential Ru-Catalyzed Ring-Closing Olefin Metathesis", Organic Letters, vol. 15, No. 10, Dated Apr. 2, 2013; pp. 2418-2421.
Database Registry, 2014 (accession date), RN1516744-75-4, Retrieved from STN international [online]; retrieved on Apr. 6, Database Registry, 2014, 1 page.

(Continued)

*Primary Examiner* — Rosalynd A Keys
(74) *Attorney, Agent, or Firm* — CANTOR COLBURN LLP

(57) ABSTRACT

A method for producing a boron-containing compound comprises a step of reacting a first raw material compound having a carbon-carbon double bond with a second raw material compound having a conjugated diene skeleton in the presence of a metal catalyst to obtain a boron-containing compound having a 1,4-diene skeleton, wherein at least one of the first raw material compound and the second raw material compound has a boron-containing group bonded to a carbon atom constituting the carbon-carbon double bond or the conjugated diene skeleton, and the boron-containing compound has the 1,4-diene skeleton and the boron-containing group.

11 Claims, No Drawings

(56) References Cited

OTHER PUBLICATIONS

Ronson, T.O et al., "Macrocyclic polyenynes: a stereoselective route to vinyl-ether-containing skipped diene systems", Chemical Communications, vol. 51, 2015, pp. 8034-8036.

Schmidt et al., "Selective [1,4]-Hydrovinylation of 1,3-Dienes with Unactivated Olefins Enabled by Iron Diimine Catalysts", J. Am. Chem. Soc., 2018, vol. 140, pp. 3443-3453, Supporting Information (SI-S18, S67-S70), in particular, Scheme 4, Supporting Information (S67-S69).

International Search Report for International Application No. PCT/JP2020/004682; Date of Mailing, Apr. 21, 2020.

PCT International Preliminary Report on Patentability for International Application No. PCT/JP2020/004682; Date of Mailing, Aug. 12, 2021.

"STN Registry", RN2234333-81-2, STN Registry, Aug. 3, 2018; 34 pages.

Hirano et al., "In Situ Routes to Catalytically Active Ru(0) Species by Reduction of Readily Available, Air-Stable Precursors", Organometallics, vol. 2018, No. 37, Mar. 27, 2018, pp. 1092-1102.

Cannon et al., "Alkene Chemoselectivity in Ruthenium-Catalyzed Z-Selective Olefin Metathesis", Angew Chem Int Ed Engl. doi: 10.1002/anie.201302724, 2013, vol. 52, No. 34; 4 pages,.

* cited by examiner

BORON-CONTAINING COMPOUND AND METHOD FOR PRODUCING SAME

CROSS REFERENCE TO RELATED APPLICATIONS

This is the U.S. national stage of application No. PCT/JP2020/004682, filed on Feb. 6, 2020. Priority under 35 U.S.C. § 119 (a) and 35 U.S.C. § 365 (b) is claimed from Japanese Application No. 2019-021791, filed Feb. 8, 2019, the disclosure of which is also incorporated herein by reference.

TECHNICAL FIELD

The present invention relates to a boron-containing compound having a 1,4-diene skeleton, and a method for producing the same.

BACKGROUND ART 1,4-Diene, which has two carbon-carbon double bonds bonded interrupted by one carbon atom and which is also referred to as skipped diene, is a structure often found in physiologically active substances, natural products and the like. As a method for constructing the skipped diene, for example, a construction method by a Wittig reaction of homoallyl phosphorus ylide and an aldehyde is known (for example, Non Patent Literature 1).

CITATION LIST

Non Patent Literature

Non Patent Literature 1: Chem. Commun. 2015, 51, p. 8034-8036

SUMMARY OF INVENTION

Technical Problem

Skipped dienes are easily isomerized to more stable conjugated dienes when severe reaction conditions are applied in a subsequent reaction. Accordingly, in synthesis of a physiologically active substance containing a skipped diene skeleton and the like, it is desirable that the skipped diene skeleton is introduced at around the final stage of a multistep reaction.

However, conventional methods such as the method described in Non Patent Literature 1 have problems such as restriction of functional groups and an increase in reaction stages due to protection/deprotection, and therefore it has been difficult to introduce a skipped diene skeleton at around the final stage.

An object of the present invention is to provide a boron-containing compound having a 1,4-diene skeleton (skipped diene skeleton), which is useful as a building block that can be introduced at around the final stage of a multi-stage reaction, and a method for producing the same.

Solution to Problem

One aspect of the present invention relates to a method for producing a boron-containing compound having a 1,4-diene skeleton. The production method comprises a step of reacting a first raw material compound having a carbon-carbon double bond with a second raw material compound having a conjugated diene skeleton in the presence of a metal catalyst to obtain a boron-containing compound having 1,4-diene skeleton. Further, in the production method, at least one of the first raw material compound and the second raw material compound has a boron-containing group bonded to a carbon atom constituting the carbon-carbon double bond or the conjugated diene skeleton. As a result, the boron-containing compound has the 1,4-diene skeleton and the boron-containing group.

According to the production method, a boron-containing compound having a 1,4-diene skeleton and a boron-containing group bonded thereto can be easily obtained. Such a boron-containing compound allows a 1,4-diene skeleton to be easily introduced into a target compound through a reaction with use of the boron-containing group as a starting point (for example, a cross coupling reaction). In addition, since the boron-containing group can be applied to reactions having high functional group acceptability such as Suzuki-Miyaura coupling reaction, the boron-containing compound can be effectively used as a building block that can be introduced at around the final stage of a multistep reaction. Such an idea is referred to as late-stage diversification, which allows greatly large numbers of analogs to be synthesized from a common parent compound, being important in search and production of medicines and pesticides, which require a series of analogs with a certain physiological activity.

In one aspect, the first raw material compound may be a compound represented by the following formula (I-1), the second raw material compound may be a compound represented by the following formula (II-1), and the boron-containing compound may be a compound represented by the following formula (III-1).

[Chemical Formula 1]

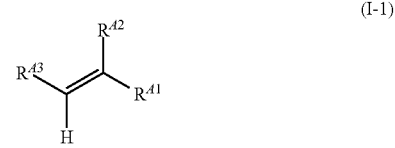

(I-1)

[Chemical Formula 2]

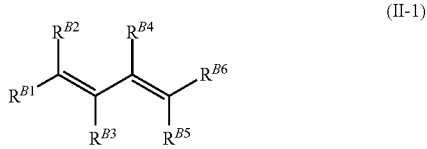

(II-1)

[Chemical Formula 3]

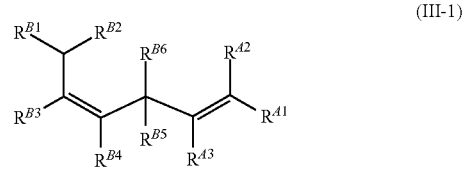

(III-1)

In the above formulas (I-1), (II-1) and (III-1), $R^{A1}$, $R^{A2}$, $R^{A3}$, $R^{B1}$, $R^{B2}$, $R^{B3}$, $R^{B4}$, $R^{B5}$ and $R^{B6}$ each independently represent a hydrogen atom or a monovalent group. However, at least one of $R^{A1}$, $R^{B1}$, $R^{B2}$, $R^{B3}$, $R^{B4}$, $R^{B5}$ and $R^{B6}$ is a boron-containing group.

In an aspect, the above $R^{A1}$ may be a boron-containing group.

In an aspect, the above $R^{B1}$ may be a boron-containing group.

In an aspect, at least one of the above $R^{B5}$ and $R^{B6}$ may be a hydrogen atom.

In one aspect, the above metal catalyst may be an asymmetric catalyst, and in that case, the above boron-containing compound may have optical activity.

In one aspect, the above metal catalyst may be a ruthenium catalyst.

Another aspect of the present invention relates to a boron-containing compound represented by the following formula (III-1).

[Chemical Formula 4]

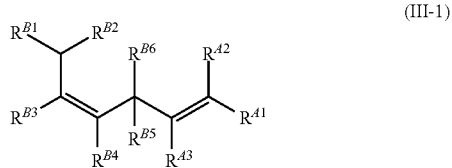

(III-1)

In the formula (III-1), $R^{A1}$, $R^{A2}$, $R^{A3}$, $R^{B1}$, $R^{B2}$, $R^{B3}$, $R^{B4}$, $R^{B5}$ and $R^{B6}$ each independently represent a hydrogen atom or a monovalent group. However, at least one of $R^{A1}$, $R^{B1}$, $R^{B2}$, $R^{B3}$, $R^{B4}$, $R^{B5}$ and $R^{B6}$ is a boron-containing group.

In an aspect, the above $R^{A1}$ may be a boron-containing group.

In an aspect, the above $R^{B1}$ may be a boron-containing group.

In the boron-containing compound in an aspect, one of the above $R^{B5}$ and $R^{B6}$ may be a hydrogen atom, and another may be a monovalent group.

The boron-containing compound in an aspect may have optical activity.

Advantageous Effects of Invention

According to the present invention, a boron-containing compound having a 1,4-diene skeleton (skipped diene skeleton), which is useful as a building block that can be introduced at around the final stage of a multi-stage reaction, and a method for producing the same, are provided.

DESCRIPTION OF EMBODIMENTS

A preferred embodiment of the present invention is described in detail as follows.
<Method for Producing Boron-Containing Compound>

The method for producing a boron-containing compound according to the present embodiment comprises a step of reacting a first raw material compound having a carbon-carbon double bond with a second raw material compound having a conjugated diene skeleton in the presence of a metal catalyst to obtain a boron-containing compound having 1,4-diene skeleton (step of forming 1,4-diene). At least one of the first raw material compound and the second raw material compound has a boron-containing group bonded to a carbon atom constituting the carbon-carbon double bond or the conjugated diene skeleton. As a result, the boron-containing compound has a 1,4-diene skeleton and a boron-containing group.

According to the production method in the present embodiment, a boron-containing compound having a 1,4-diene skeleton and a boron-containing group can be easily obtained. Such a boron-containing compound allows a 1,4-diene skeleton to be easily introduced into a target compound through a reaction with use of the boron-containing group as a starting point (for example, a cross coupling reaction). In addition, since the boron-containing group can be applied to reactions having high functional group acceptability such as Suzuki-Miyaura coupling reaction, the above boron-containing compound can be effectively used as a building block that can be introduced at around the final stage of a multistep reaction.

In the present specification, the boron-containing group may be an atomic group remaining after removing one functional group on the boron atom in a boron compound. In other words, the boron-containing group may be a monovalent group that binds to a binding target through a boron atom.

The boron-containing group is not particularly limited and may be appropriately selected within a range in which a reaction between the first raw material compound and the second raw material compound proceeds. Examples of the boron-containing group include a boryl group, a borono group, a borate group, and derivative groups thereof.

The boryl group represents a group represented by —$BH_2$. Examples of derivative groups of the boryl group include a diorganoboryl group.

The diorganoboryl group may be, for example, a group represented by —$B(R^{21})_2$. $R^{21}$ represents a monovalent group. The two $R^{21}$ may be the same or different and may be linked to each other to form a ring with a boron atom. $R^{21}$ may be, for example, a monovalent organic group, and may be an alkyl group which may have a substituent or an aryl group which may have a substituent.

The alkyl group in $R^{21}$ may be in a linear form, a branched form or a cyclic form. The number of carbons of the alkyl group in $R^{21}$ is not particularly limited and may be, for example, 1 to 8.

The aryl group in $R^{21}$ represents an atomic group remaining after removing one hydrogen atom on the aromatic ring from an aromatic compound. The aromatic ring of the aromatic compound may be a monocycle, a condensed ring, or a heterocycle. Examples of the aromatic compound include benzene, naphthalene, furan, pyrrole, thiophene, and pyridine.

The substituent that the alkyl group and the aryl group in $R^{21}$ may have is not particularly limited within a range where a reaction between the first raw material compound and the second raw material compound proceeds. Examples of the substituent include a hydroxy group, a carbonyl group, a formyl group, a hydroxycarbonyl group, an ester group, an amino group and a thiol group.

Specific examples of the diorganoboryl group include a diphenylboryl group, a dicyclohexyl group, a bicyclo[3.3.1]nonane-1,5-diyl group, and a disiamyl group.

The borono group represents a group represented by —$B(OH)_2$. Examples of the derivative group of the borono group include a boronate group and a protected borono group.

The boronate group may be, for example, a group represented by —$B(OR^{22})_2$. $R^{22}$ represents a monovalent group. The two $R^{22}$ may be the same or different, and may be linked to each other to form a ring with a boron atom and an oxygen atom. $R^{22}$ may be, for example, a monovalent organic group, and may be an alkyl group which may have a substituent or an aryl group which may have a substituent. Examples of the alkyl group, the aryl group and the substituent which these may have in $R^{22}$ include the same ones as the alkyl group, the aryl group and the substituent which these may have in $R^{21}$.

Specific examples of the boronate group include a diisopropylboronate group, and a ditert-butylboronate group.

The protected borono group is not particularly limited and may be, for example, a group protected by a known method for protecting a borono group.

Examples of the protected borono group include a group formed by the reaction of a difunctional compound such as diol, diamine and dicarboxylic acid with a borono group. Examples of the diol include pinacol, neopentyl glycol, catechol, pinane diol, and 1,2-dicyclohexyl diol. Examples of the diamine include 1,8-diaminonaphthalene. Examples of the dicarboxylic acid include N-methyl iminodiacetic acid.

Further, examples of the protected borono group include a borate group such as triol borate group. A triol borate group is formed by the reaction of a triol and a borono group. Examples of triol include trimethylolethane(1,1,1-tris(hydroxymethyl)ethane). The counter cation of the borate group is not particularly limited, and may be, for example, a sodium ion ($Na^+$), a potassium ion ($K^+$) or an organophosphonium ion ($PR_4^+$).

Examples of the borate group include a trifluoroborate group ($—BF_3^-$) in addition to the triol borate groups described above. The counter cation of the borate group is not particularly limited, and may be, for example, a sodium ion ($Na^+$), a potassium ion ($K^+$) or an organophosphonium ion ($PR_4^+$).

The metal catalyst may be any catalyst capable of forming a 1,4-diene skeleton by a reaction between a carbon-carbon double bond and a conjugated diene.

As the metal catalyst, a catalyst containing at least one selected from the group consisting of ruthenium (Ru), cobalt (Co), iron (Fe) and nickel (Ni) is preferred, a catalyst containing ruthenium and cobalt is more preferred, and a catalyst containing ruthenium (ruthenium catalyst) is still more preferred.

It is preferable that the ruthenium catalyst be a catalyst capable of forming a zero-valent ruthenium (Ru(0)) in a reaction system, from the viewpoint of capability of efficient reaction between the first raw material compound and the second raw material compound through a reaction mechanism described below. In other words, the above step for forming 1,4-diene may be a step of reacting the first raw material compound and the second raw material compound in the presence of Ru(0).

An example of the above reaction mechanism of the step of forming 1,4-diene is described as follows. In the following example, the reaction mechanism is described using mono-substituted butadiene as the first raw material compound, mono-substituted ethylene as the second raw material compound, and [(naphthalene)(1,5-cyclooctadiene)ruthenium] as the metal catalyst, thought the present invention is not limited thereto. In the following example, at least one of $R^{A1}$ and $R^{B1}$ is a boron-containing group, and both of them may be boron-containing groups. Further, the reaction mechanism of the step of forming 1,4-diene is not limited to the following example.

[Chemical Formula 5]

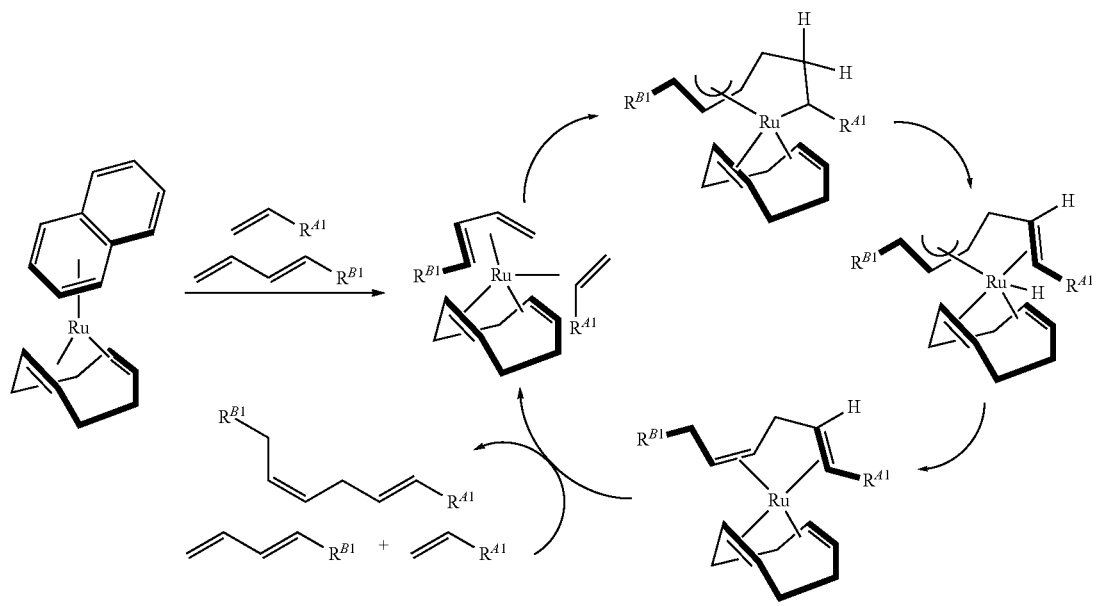

In the reaction mechanism described above, an easily dissociable naphthalene ligand is dissociated from a ruthenium catalyst, and instead, the first raw material compound and the second raw material compound are coordinated on ruthenium. A carbon-carbon bond is then formed through an oxidative coupling mechanism, so that a cyclic intermediate (metallacycle) containing a ruthenium atom is formed. Further, boron-containing compound having a 1,4-diene skeleton is formed through desorption of β-hydride and reductive desorption.

Examples of the catalyst capable of forming Ru(0) in a reaction system include a zero-valent ruthenium complex having Ru(0) and a divalent ruthenium complex having Ru(II).

Examples of the zero-valent ruthenium complex include [(naphthalene)(1,5-cyclooctadiene)ruthenium(0)], [(naphthalene)(dibenzocyclooctatetraene)ruthenium(0)], and [(butadiene)(1,5-cyclooctadiene)(acetonitrile)ruthenium (0)].

Examples of the divalent ruthenium complex include [bis(acetylacetonato)(1,5-cyclooctadiene)ruthenium(II)] and [tetrachlorodi(anisole)diruthenium]. The divalent ruthenium complex may be reduced in a reaction system to form Ru(0). The divalent ruthenium complex may be reduced by the reaction with a reaction substrate (the first raw material compound and/or the second raw material compound), may be reduced by a reaction between ruthenium complexes, or may be reduced by a reaction with a reducing agent added separately. Examples of the reducing agent include butyl lithium, lithium aluminum hydride, sodium naphthalene, and a combination of sodium carbonate and isopropyl alcohol.

The type of ruthenium catalyst is not limited to the above, and any catalyst capable of forming a metallacycle may be used. For example, the ruthenium catalyst may be a catalyst that forms tetravalent ruthenium (Ru(IV)) during formation of a metallacycle. In other words, the ruthenium catalyst may be a catalyst capable of forming a metallacycle containing tetravalent ruthenium (Ru(IV)) in a reaction system.

Alternatively, an asymmetric catalyst may be used as the ruthenium catalyst. The asymmetric catalyst may be a catalyst containing a ligand having optical activity. Examples of the optically active ligand include bicyclo[2.2.1]heptadiene having a substituent, bicyclo[2.2.2]octadiene having a substituent, and bicyclo[3.3.1]nonadiene having a substituent. Specific examples of the asymmetric catalyst having the ligands include a compound represented by the following formula (IV-1), a compound represented by the following formula (IV-2), a compound represented by the following formula (IV-3), and a compound represented by the following formula (IV-4). In the following asymmetric catalyst, the naphthalene ligand may be replaced with another ligand easily dissociable from the ruthenium catalyst.

[Chemical Formula 6]

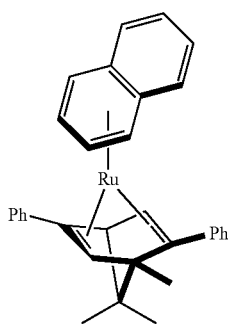

(IV-1)

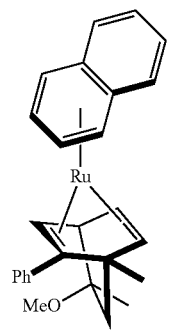

(IV-2)

-continued

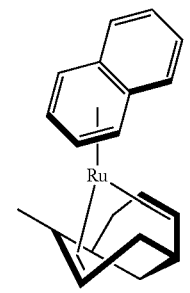

(IV-3)

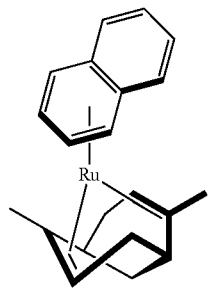

(IV-4)

As the cobalt complex, a catalyst capable of forming monovalent cobalt (Co(I)) or zero-valent cobalt (Co(0)) in a reaction system is preferred. Examples of such a catalyst include a divalent cobalt complex having Co(II). The divalent cobalt complex may be used in combination with a reducing agent. Examples of the reducing agent include the same ones as described above. Alternatively, as the reducing agent, a metallic reducing agent such as metallic zinc or activated magnesium may be used.

Alternatively, an asymmetric catalyst may be used as the cobalt complex. The asymmetric catalyst may be a catalyst containing a ligand having optical activity. Examples of the ligand having optical activity include an optically active phosphorus compounds such as Binap, Pinap, Segphos, DuPhos, QuinoxP*, bis(diphenylphosphino)pentane, and phosphoramidite.

In the boron-containing compound, the carbon atom interrupting the two carbon-carbon double bonds may be an asymmetric carbon atom. In that case, use of an asymmetric catalyst as the metal catalyst allows a boron-containing compound having optical activity to be obtained.

The amount of the metal catalyst is not particularly limited, and may be, for example, 0.01 mol % or more, preferably 1 mol % or more, and more preferably 5 mol % or more, relative to the first raw material compound. Further, the amount of the metal catalyst may be, for example, 30 mol % or less, preferably 20 mol % or less, and more preferably 10 mol % or less, relative to the first raw material compound.

In the step of forming 1,4-diene, the reaction between the first raw material compound and the second raw material compound may be performed without solvent, or may be performed in an organic solvent. The type of organic solvent is not particularly limited as long as the solvent can dissolve the first raw material compound and the second raw material compound. Examples of the organic solvent include diethyl ether, tetrahydrofuran, acetone, hexane, benzene, toluene, dichloromethane, and dimethyl sulfoxide, and from the viewpoint of lower possibility of inhibiting the reaction between the first raw material compound and the second raw material compound, tetrahydrofuran, acetone, benzene, toluene and the like are preferred.

The amount of the organic solvent is not particularly limited, and may be, for example, 100 parts by mass or more, preferably 1000 parts by mass or more, and, for example, 100000 parts by mass or less, preferably 10000 parts by mass or less, relative to 100 parts by mass in total of the first raw material compound and the second raw material compound.

In the step of forming 1,4-diene, the reaction temperature is not particularly limited, and may be, for example, 0 to 100° C. The reaction time is not particularly limited, and may be appropriately adjusted depending on the types of reaction substrate and catalyst, the desired yield, etc. The reaction time may be, for example, 0.1 to 72 hours, preferably 1 to 24 hours.

In a preferred aspect, the first raw material compound may be a compound represented by the following formula (I-1) (hereinafter, also referred to as compound (I-1)), and the second raw material compound may be a compound represented by the following formula (II-1) (hereinafter, also referred to as compound (II-1)). By using such a first raw material compound and second raw material compound, a compound represented by the following formula (III-1) (hereinafter, also referred to as compound (III-1)) is obtained as a boron-containing compound.

[Chemical Formula 7]

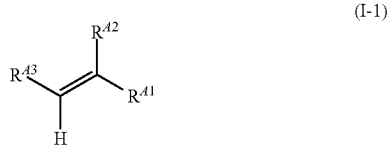

(I-1)

[Chemical Formula 8]

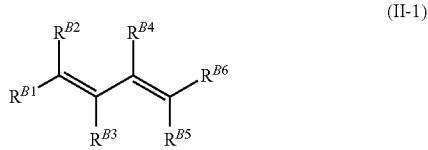

(II-1)

[Chemical Formula 9]

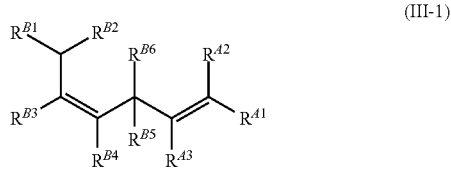

(III-1)

In the above formulas (I-1), (II-1) and (III-1), $R^{A1}$, $R^{A2}$, $R^{A3}$, $R^{B1}$, $R^{B2}$, $R^{B3}$, $R^{B4}$, $R^{B5}$ and $R^{B6}$ each independently represents a hydrogen atom or a monovalent group. However, at least one of $R^{A1}$, $R^{B1}$, $R^{B2}$, $R^{B3}$, $R^{B4}$, $R^{B5}$ and $R^{B6}$ is a boron-containing group.

$R^{B5}$ and $R^{B6}$ may be different groups, and in that case, the compound (III-1) may have an asymmetric carbon atom.

The monovalent group in $R^{A1}$ is not particularly limited, and may be appropriately selected within a range in which a reaction between the compound (I-1) and the compound (II-1) proceeds. The monovalent group in $R^{A1}$ may be, for example, a monovalent organic group or a halogeno group.

$R^{A1}$ may be, for example, a hydrogen atom, a halogeno group, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and these groups may have a substituent.

The halogeno group in $R^{41}$ may be a fluoro group (—F), a chloro group (—Cl), a bromo group (—Br) or an iodo group (—I), and preferably a fluoro group (—F) or a chloro group (—Cl) or a bromo group (—Br).

The alkyl group in $R^{41}$ may be in a linear from, a branched form, or a cyclic form. The number of carbons of the alkyl group in $R^{41}$ is not particularly limited, and may be, for example, 1 to 8.

The alkenyl group in $R^{41}$ may be in a linear form, a branched form or a cyclic form. The number of carbons of the alkenyl group in $R^{41}$ is not particularly limited, and may be, for example, 1 to 8.

The aryl group in $R^{41}$ represents an atomic group remaining after removing one hydrogen atom on an aromatic ring from an aromatic compound. The aromatic ring of the aromatic compound may be a monocycle, a condensed ring, or a heterocycle. Examples of the aromatic compound include benzene, naphthalene, and thiophene.

The substituent that the alkyl group, the alkenyl group and the aryl group in $R^{41}$ may have is not particularly limited within a range in which a reaction between the first raw material compound and the second raw material compound proceeds. Examples of the substituent include an aryl group, an alkyloxy group, an aryloxy group, a hydroxyl group, a formyl group, a carbonyl group, an amino group, and a halogeno group.

$R^{41}$ represents a hydrogen atom or a monovalent group. $R^{41}$ may be, for example, a hydrogen atom or a monovalent organic group, and may be a hydrogen atom, an alkyl group which may have a substituent or an aryl group which may have a substituent.

$R^{42}$ represents a hydrogen atom or a monovalent group. $R^{42}$ may be, for example, a hydrogen atom or a monovalent organic group, may be a hydrogen atom, an alkyl group which may have a substituent or an aryl group which may have a substituent, and may be an alkyl group which may have a substituent or an aryl group which may have a substituent.

$R^{43}$ and $R^{44}$ each independently represents a hydrogen atom or a monovalent group. The monovalent group in $R^{43}$ and $R^{44}$ may be, for example, a monovalent organic group, and may be an alkyl group which may have a substituent or an aryl group which may have a substituent.

$R^{45}$ represents a hydrogen atom or a monovalent group. $R^{45}$ may be, for example, a hydrogen atom or a monovalent organic group, may be a hydrogen atom, an alkyl group which may have a substituent or an aryl group which may have a substituent, or may be an alkyl group which may have a substituent or an aryl group which may have a substituent.

Examples of the alkyl group and the aryl group in $R^{41}$, $R^{42}$, $R^{43}$, $R^{44}$ and $R^{45}$ and substituents that these may have include the same alkyl group and aryl group in the above $R^{41}$ and substituents that these may have.

The monovalent group in $R^{A2}$ and $R^{A3}$ is not particularly limited and may be appropriately selected within a range in which a reaction between the compound (I-1) and the compound (II-1) proceeds. The monovalent group in $R^{A2}$ and $R^{A3}$ may be, for example, a monovalent organic group or a halogeno group. $R^{A2}$ and $R^{A3}$ may be, for example, a hydrogen atom, a halogeno group, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and these groups may have a substituent. Examples of the individual groups in $R^{42}$ and $R^{43}$ may include the same individual groups in $R^{41}$ described above.

In the compound (I-1), it is preferable that $R^{41}$ be an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group.

In the case where the compound (II-1) has no boron-containing group (in the case where none of $R^{B1}$, $R^{B2}$, $R^{B3}$, $R^{B4}$, $R^{B5}$ and $R^{B6}$ is a boron-containing group), it is preferable that $R^{41}$ be a boron-containing group. In the case where $R^{41}$ is a boron-containing group, a boron-containing compound having a structure in which the boron-containing group is bonded to a terminal of a 1,4-diene skeleton is obtained.

Further, in the case where the compound (II-1) has a boron-containing group (in the case where at least one of $R^{B1}$, $R^{B2}$, $R^{B3}$, $R^{B4}$, $R^{B5}$ and $R^{B6}$ is a boron-containing group), it is preferable that $R^{41}$ be an alkyl group, an alkenyl group, an aryl group, a group represented by —C(=O)$R^{41}$, a group represented by —C(=O)O$R^{42}$, a group represented by —C(=O)N$R^{43}R^{44}$, or a boron-containing group. On this occasion, in the case where a boron-containing group different from the boron-containing group which the compound (II-1) has is selected as the boron-containing group in $R^{41}$, a different reaction may be performed for each boron-containing group by utilizing the difference in reactivity, which is more useful for constructing compounds.

In addition, in the compound (I-1), it is preferable that $R^{42}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, or a group represented by —O$R^{45}$, and a hydrogen atom or an alkyl group is more preferable, and a hydrogen atom is still more preferable.

Further, in the compound (I-1), it is preferable that $R^{43}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, or a group represented by —O$R^{45}$, and a hydrogen atom or an alkyl group is more preferable, and a hydrogen atom is still more preferable.

The monovalent group in $R^{B1}$, $R^{B2}$, $R^{B3}$, $R^{B4}$, $R^{B5}$ and $R^{B6}$ is not particularly limited, and may be appropriately selected within a range in which a reaction between the compound (I-1) and the compound (II-1) proceeds. The monovalent group in $R^{B1}$, $R^{B2}$, $R^{B3}$, $R^{B4}$, $R^{B5}$ and $R^{B6}$ may be, for example, a monovalent organic group or a halogeno group. $R^{B1}$, $R^{B2}$, $R^{B3}$, $R^{B4}$, $R^{B5}$ and $R^{B6}$ are, for example, a hydrogen atom, a halogeno group, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and these group may have a substituent. Examples of the individual groups in $R^{B1}$, $R^{B2}$, $R^{B3}$, $R^{B4}$, $R^{B5}$ and $R^{B6}$ include the same individual groups in $R^{41}$ described above.

In the compound (II-1), it is preferable that $R^{B1}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and a hydrogen atom, an alkyl group, an alkenyl group, or a boron-containing group are more preferable.

In the case where the compound (I-1) has no boron-containing group (in the case where none of $R^{41}$, $R^{42}$ and $R^{43}$ is a boron-containing group), it is preferable that $R^{B1}$ be a boron-containing group. In the case where $R^{B1}$ is a boron-containing group, a boron-containing compound having a structure in which a 1,4-diene skeleton and a boron-containing group are bonded interrupted by one carbon atom is obtained.

Further, in the case where the compound (I-1) has a boron-containing group (in the case where at least one of $R^{41}$, $R^{42}$ and $R^{43}$ is a boron-containing group), it is preferable that $R^{B1}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and a hydrogen atom, an alkyl group, an alkenyl group, or a boron-containing group are more preferable. On this occasion, in the case where a boron-containing group different from the boron-containing group which the compound (I-1) has is selected as the boron-containing group in $R^{B1}$, a different reaction may be performed for each boron-containing group by utilizing the difference in reactivity, which is more useful for constructing compounds.

In the compound (II-1), it is preferable that $R^{B2}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and a hydrogen atom, an alkyl group or an alkenyl group are more preferable.

In the compound (II-1), it is preferable that $R^{B3}$ and $R^{B4}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group, and a hydrogen atom, an alkyl group, or an alkenyl group are more preferable.

In the compound (II-1), it is preferable that $R^{B5}$ and $R^{B6}$ be a hydrogen atom, an alkyl group, an alkenyl group, an aryl group, a group represented by —C(=O)$R^{41}$, a group represented by —C(=O)O$R^{42}$, a group represented by —C(=O)N$R^{43}R^{44}$, a group represented by —O$R^{45}$, or a boron-containing group. Further, it is preferable that at least one of $R^{B5}$ and $R^{B6}$ be a hydrogen atom. $R^{B5}$ and $R^{B6}$ may be different groups, and in that case, in the compound (III-1), the carbon atom bonded to $R^{B5}$ and $R^{B6}$ may be an asymmetric carbon atom.

In a preferable aspect, one of $R^{B5}$ and $R^{B6}$ may be a hydrogen atom, and the other may be a monovalent group; or one may be a hydrogen atom, and the other may be an alkyl group.

<Boron-Containing Compound>

The boron-containing compound according to the present embodiment is a compound produced by the production method described above, having a 1,4-diene skeleton and a boron-containing group bonded to the 1,4-diene skeleton directly or through one carbon atom.

Examples of the boron-containing compound according to the present embodiment include a boron-containing compound represented by a formula (III-1) (compound (III-1)).

[Chemical Formula 10]

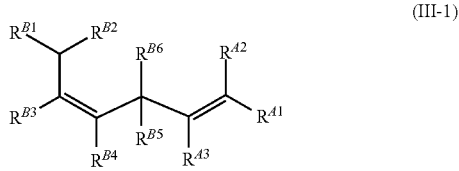

(III-1)

In the formula, $R^{A1}$, $R^{A2}$, $R^{A3}$, $R^{B1}$, $R^{B2}$, $R^{B3}$, $R^{B4}$, $R^{B5}$ and $R^{B6}$ may be the same individual ones described above.

In a preferable aspect, $R^{A1}$ may be a boron-containing group. Thereby, the boron-containing compound can be effectively used as a building block capable of directly introducing a 1,4-diene skeleton.

In another preferable aspect, $R^{B1}$ may be a boron-containing group. Thereby, the boron-containing compound can be effectively used as a building block capable of introducing a 1,4-diene skeleton interrupted by one carbon atom.

Further, in the compound (III-1), one of $R^{B5}$ and $R^{B6}$ may be a hydrogen atom, and the other may be a monovalent group; or one may be a hydrogen atom, and the other may be an alkyl group. It is difficult to produce such a compound (III-1) by a known method. Further, in the case where such a compound (III-1) is a compound having optical activity, the compound (III-1) is also highly useful as an intermediate for synthesizing biologically active substances and the like.

The preferred embodiment of the present invention has been described above, though the present invention is not limited thereto.

EXAMPLES

Hereinafter, the present invention will be described in more detail with reference to Examples, though the present invention is not limited thereto.

Example 1

A boron-containing compound (B-1) was synthesized by the following method.

[Chemical Formula 11]

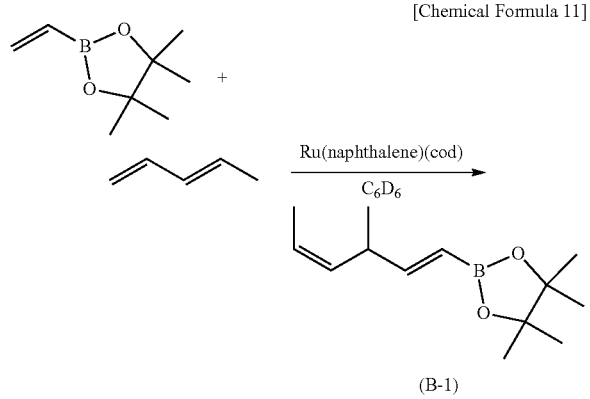

(B-1)

Specifically, vinylboronic acid pinacol ester (10.0 μL, 0.0590 mmol) and 1,3-pentadiene (6.0 μL, 0.060 mmol) were dissolved in benzene-$d_6$ (0.5 mL), and [Ru(naphthalene)(cod)] ([(naphthalene) (1,5-cyclooctadiene)ruthenium (0)]) (1.6 mg, 0.0047 mmol) was added thereto. After reacting at 30° C. for 1 hour, (1E,4Z)-3-methyl-1,4-hexadienylboronic acid pinacol ester (boron-containing compound (B-1)) was produced at a yield of 91%. The production of the boron-containing compound was confirmed by $^1$H-NMR measurement, $^{13}$C-NMR measurement and high resolution mass spectrometry. The measurement results were as follows.

$^1$H NMR (400 MHz, $C_6D_6$, r.t.): δ 0.99 (d, 3H, J=6.4 Hz), 1.07 (s, 12H), 1.42 (dd, 3H, J=6.8, 1.7 Hz), 3.18 (sext, 1H, J=7.4 Hz), 5.23 (dq, 1H, J=10, 7 Hz), 5.36 (ddq, 1H, J=10, 9, 1.7 Hz), 5.79 (dd, 1H, J=17.8, 1.7 Hz), 6.93 (dd, 1H, J=17.8, 5.7 Hz). $^{13}$C[$^1$H] NMR (100 MHz, $C_6D_6$, r.t.): δ 12.92 (s), 20.12 (s), 24.91 (s), 37.34 (s), 82.90 (s), 123.83 (s), 126.02 (s), 133.80 (s), 157.87 (s).

HRMS (APCI): m/z calcd for $C_{13}H_{23}BO_2$+H$^+$: 223.1866 [M+H]$^+$; found: 223.1864.

Example 2

A boron-containing compound (B-2) was synthesized by the following method.

[Chemical Formula 12]

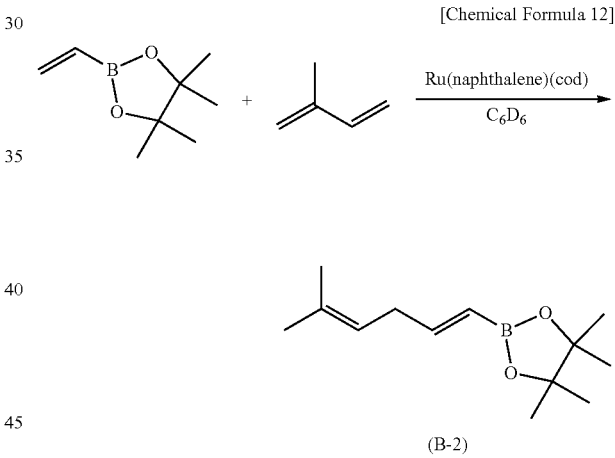

(B-2)

Specifically, vinylboronic acid pinacol ester (10.0 μL, 0.0590 mmol) and isoprene (6.0 μL, 0.060 mmol) were dissolved in benzene-$d_6$ (0.5 mL), and [Ru(naphthalene)(cod)] (1.4 mg, 0.0042 mmol) was added thereto. After reacting at 30° C. for 17 hours, (1E)-5-methyl-1,4-hexadienylboronic acid pinacol ester (boron-containing compound (B-2)) was produced at a yield of 51%. The results of $^1$H-NMR measurement, $^{13}$C-NMR measurement and high resolution mass spectrometry were as follows.

$^1$H NMR (400 MHz, $C_6D_6$, r.t.): δ 1.08 (s, 12H), 1.40 (s, 3H), 1.56 (s, 3H), 2.77 (t, 2H, J=6.3 Hz), 5.16 (tq, 1H, J=6.8, 1.1 Hz), 5.82 (dt, 1H, J=17.8, 1.7 Hz), 6.95 (dt, 1H, J=17.8, 6.3 Hz). $^{13}$C[$^1$H] NMR (100 MHz, CDCl$_3$, r.t.): δ 17.66 (s), 24.77 (s), 25.69 (s), 34.28 (s), 83.01 (s), 118.17 (br. s), 120.44 (s), 133.49 (s), 152.77 (s).

HRMS (APCI): m/z calcd for $C_{13}H_{23}BO_2$+H$^+$: 223.1866 [M+H]$^+$; found: 223.1865.

Example 3

A boron-containing compound (B-3) was synthesized by the following method.

[Chemical Formula 13]

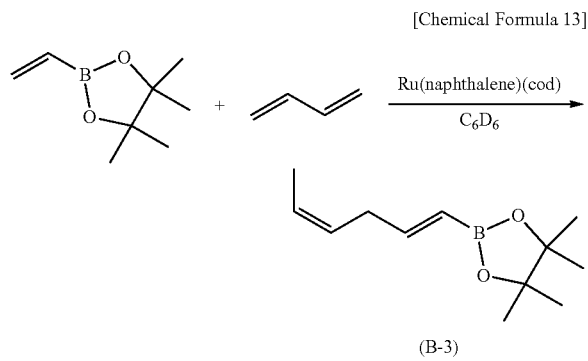

(B-3)

Specifically, vinylboronic acid pinacol ester (22.0 μL, 0.130 mmol) was dissolved in benzene-$d_6$ (0.5 mL), and [Ru(naphthalene)(cod)] (4.8 mg, 0.014 mmol) was added thereto. The mixture was freeze-degassed, and butadiene (2.94 mL, 0.13 mmol) was added thereto under reduced pressure. After reacting at 50° C. for 24 hours, (1E,4E)-1,4-hexadienylboronic acid pinacol ester (boron-containing compound (B-3)) was produced at a yield of 24%. The results of $^1$H-NMR measurement, $^{13}$C-NMR measurement and high resolution mass spectrometry were as follows.

$^1$H NMR (400 MHz, $C_6D_6$, r.t.): δ 1.07 (s, 12H), 1.40 (d, 3H, J=4.6 Hz), 2.78 (t, 2H, J=5.8 Hz), 5.40-5.46 (m, 2H), 5.81 (d, 1H, J=17.8 Hz), 6.93 (dt, 1H, J=17.8, 5.7 Hz).

$^{13}$C[$^1$H] NMR (100 MHz, $C_6D_6$, r.t.): δ 12.67 (s), 24.89 (s), 33.40 (s), 82.90 (s), 119.64 (br. s), 125.66 (s), 126.86 (s), 152.36 (s).

HRMS (APCI): m/z calcd for $C_{12}H_{21}BO_2$+H$^+$: 209.1710 [M+H]$^+$; found: 209.1709.

Example 4

A boron-containing compound (B-4) was synthesized by the following method.

[Chemical Formula 14]

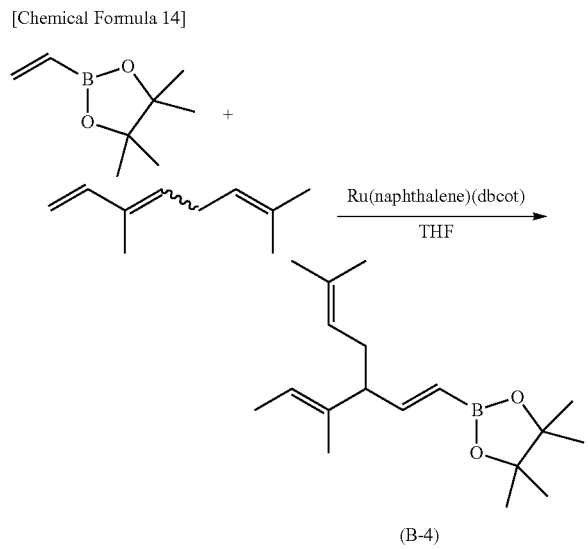

(B-4)

Specifically, vinylboronic acid pinacol ester (100 μL, 0.59 mmol) and β-ocimene (100 μL, 0.59 mmol) were dissolved in tetrahydrofuran (3 mL), and [Ru(naphthalene)(dbcot)] (5.5 mg, 0.013 mmol) was added thereto. After reacting at 30° C. for 7 hours, purification was performed using a silica gel column chromatography, so that (1E)-3-(2-butenyl)-6-methyl-1,5-heptadienylboronic acid pinacol ester (boron-containing compound (B-4)) was produced at a yield of 67%. The results of $^1$H-NMR measurement, $^{13}$C-NMR measurement and high resolution mass spectrometry were as follows.

$^1$H NMR (400 MHz, CDCl$_3$, r.t.): δ 1.07 (s, 12H), 1.49 (s, 3H), 1.58 (s, 6H), 1.66 (d, 3H, J=9.2 Hz), 2.19 (dt, 1H, J=14, 7.4 Hz), 2.27 (dt, 1H, J=14, 7.4 Hz), 3.43 (q, 1H, J=6.9 Hz), 5.14 (t, 1H, J=5.7 Hz), 5.83 (dd, 1H, J=17.8, 1.7 Hz), 7.00 (dd, 1H, J=18.4, 6.3 Hz).

$^{13}$C[$^1$H] NMR (100 MHz, CDCl$_3$, r.t.): δ 12.98 (s), 17.90 (s), 19.13 (s), 24.78 (s), 25.75 (s), 29.83 (s), 45.55 (s), 83.02 (s), 117.55 (br. s), 121.06 (s), 122.34 (s), 132.17 (s), 135.91 (s), 155.35 (s).

HRMS (APCI): m/z calcd for $C_{18}H_{31}BO_2$+H$^+$: 291.2493 [M+H]$^+$; found: 291.2494.

Example 5

A boron-containing compound (B-5) was synthesized by the following method.

[Chemical Formula 15]

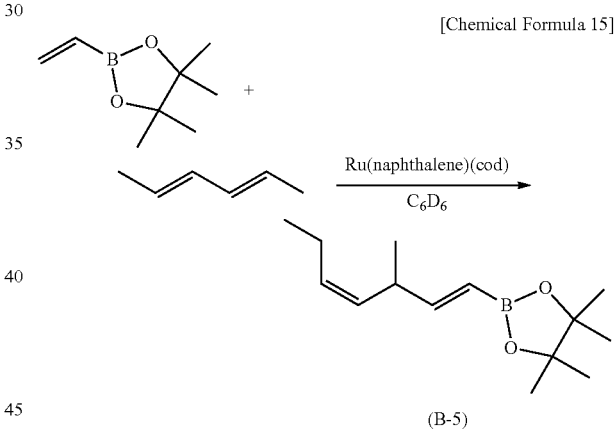

(B-5)

Specifically, vinylboronic acid pinacol ester (10.0 μL, 0.059 mmol) and 3,4-dimethyl-2,5-hexadiene (7.4 μL, 0.059 mmol) were dissolved in benzene-$d_6$ (0.5 mL), and [Ru(naphthalene)(cod)] (1.9 mg, 0.0056 mmol) was added thereto. After reacting at 50° C. for 24 hours, (1E,4Z)-3-methyl-1,4-heptadienylboronic acid pinacol ester (boron-containing compound (B-5)) was produced at a yield of 35%. The results of $^1$H-NMR measurement, $^{13}$C-NMR measurement and high resolution mass spectrometry were as follows.

$^1$H NMR (400 MHz, $C_6D_6$, r.t.): δ 0.82 (t, 3H, J=7.6 Hz), 0.99 (d, 3H, J=6.9 Hz), 1.07 (s, 12H), 1.89 (dq, 2H, J=7.4, 1.5 Hz), 3.18 (sext, 1H, J=6.9 Hz), 5.19 (ddt, 1H, J=9.2, 7.7, 1.4 Hz), 5.31 (dtd, 1H, J=10.7, 7.2, 0.9 Hz), 5.80 (dd, 1H, J=18, 1.6 Hz), 6.94 (dd, 1H, J=18, 6.1 Hz).

$^{13}$C[$^1$H] NMR (100 MHz, CDCl$_3$, r.t.): δ 14.38 (s), 20.16 (s), 20.72 (s), 24.75 (s), 37.21 (s), 83.02 (s), 115.89 (br. s), 131.37 (s), 131.88 (s), 157.78 (s).

HRMS (APCI): m/z calcd for $C_{14}H_{25}BO_2$+H$^+$: 237.2023 [M+H]$^+$; found: 237.2016.

Example 6

A boron-containing compound (B-6) was synthesized by the following method.

[Chemical Formula 16]

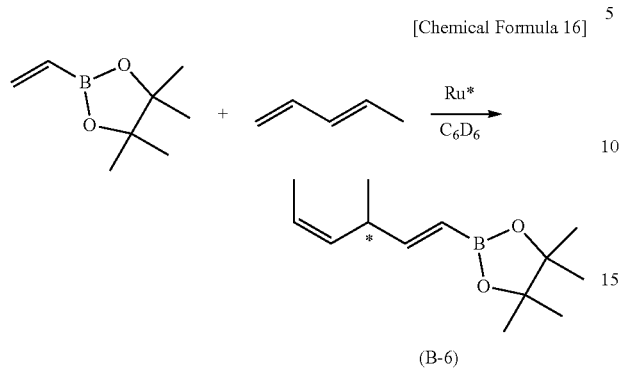

(B-6)

Specifically, vinylboronic acid pinacol ester (10.0 μL, 0.059 mmol) and 1,3-pentadiene (6.0 μL, 0.059 mmol) were dissolved in benzene-$d_6$ (0.5 mL), and a Ru catalyst represented by the following formula (IV-1) (0.3 mg, 0.5 μmol) was added thereto. After reacting at 30° C. for 4 hours, a boron-containing compound (B-6) was obtained at a yield of 20% and at an asymmetric yield of 70% ee. The asymmetric yield was obtained based on the separation results of a racemic sample and a product sample individually separated by an optical isomer separation column ("Rt-βDEXsm", purchased from Shimadzu GLC Ltd.). The results of $^1$H-NMR measurement were as follows.

$^1$H NMR (400 MHz, $C_6D_6$, r.t.): δ 0.99 (d, 3H, J=6.4 Hz), 1.07 (s, 12H), 1.42 (dd, 3H, J=6.8, 1.7 Hz), 3.18 (br. sext, 1H, J=7 Hz), 5.23 (dq, 1H, J=10, 7 Hz), 5.36 (ddq, 1H, J=10, 9, 1.7 Hz), 5.79 (dd, 1H, J=17.8, 1.7 Hz), 6.93 (dd, 1H, J=17.8, 5.7 Hz).

[Chemical Formula 17]

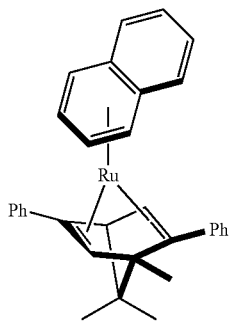

(IV-1)

Example 7

A boron-containing compound (B-7) was synthesized by the following method.

[Chemical Formula 18]

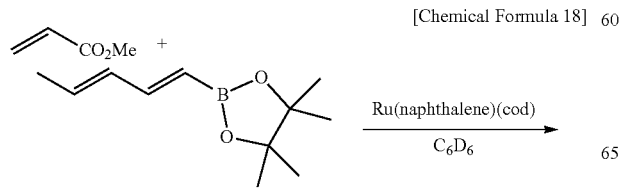

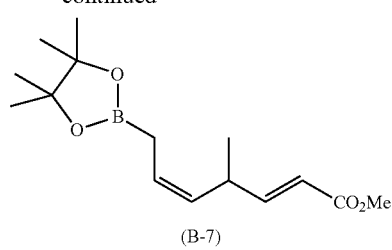

(B-7)

Specifically, methyl acrylate (9.1 μL, 0.1 mmol) and (1E,3E)-1,3-pentadienylboronic acid pinacol ester (17.6 μL, 0.10 mmol) were dissolved in benzene-$d_6$ (0.5 mL), and [Ru(naphthalene)(cod)] (3.0 mg, 0.0089 mmol) was added thereto. After reacting at 30° C. for 1 hour, a boron-containing compound (B-7) was obtained at a yield of 41%. The results of $^1$H-NMR measurement and $^{13}$C-NMR measurement were as follows.

$^1$H NMR (400 MHz, $C_6D_6$, r.t.): δ 0.88 (d, 3H, J=6.9 Hz), 1.0-1.06 (s, 12H), 1.71 (t, 2H, J=7.4 Hz), 3.12-3.20 (sext, 1H, J=6.9 Hz) 3.3-3.40 (s, 3H), 5.08 (ddt, 1H, J=10.3, 9.16 Hz), 5.68 (dt, 1H, J=9.8, 8 Hz), 5.93 (dd, 1H, J=16, 1.7 Hz), 7.05 (dd, 1H, J=16, 6.3 Hz).

$^{13}$C[$^1$H] NMR (100 MHz, $CDCl_3$, r.t.): δ 19.74 (s), 24.70 (s), 34.25 (s), 51.36 (s), 77.20 (s), 83.34 (s), 118.86 (s), 125.46 (s), 130.87 (s), 152.83 (s), 167.42 (s).

Example 8

Boron-containing compounds (B-1) and (B-1') were synthesized by the following method.

[Chemical Formula 19]

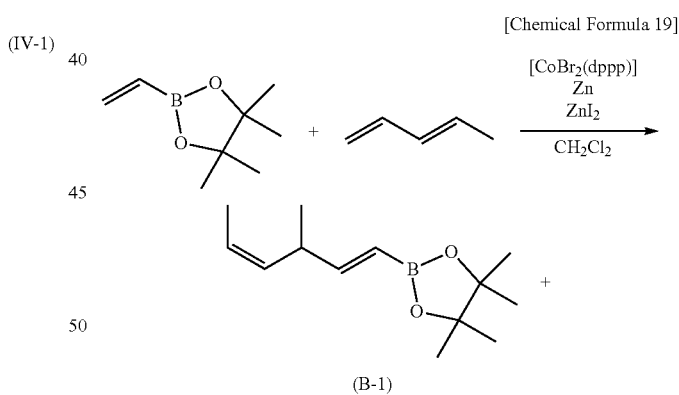

(B-1)

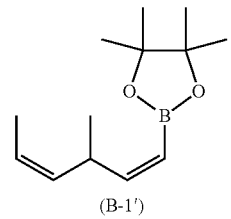

(B-1')

Specifically, $CH_2Cl_2$ (1 mL), 1,3-pentadiene (100 μL, 1.00 mmol) and vinylboronic acid pinacol ester (170 μL, 0.99 mmol) were added to a 25-mL Schlenk purged with nitrogen. Subsequently, [$CoBr_2$ (dppp)] (39.55 mg, 0.06266 mmol), ZnI$_2$ (71.60 mg, 0.2243 mmol), Zn (18.0 mg, 0.2753 mmol) were added thereto for reacting at room temperature (30° C.) for 4 hours. After addition of ether to the reaction solution, the insoluble material was removed by tube filtration, and the solvent was evaporated. Then, the product was purified by a short column and GPC, and a boron-containing compound (B-1) ((1E,4Z), 186.1 mg, 82%) and a boron-containing compound (B-1') ((1Z,4Z), 41.9 mg, 18%) were quantitatively obtained.

The results of $^1$H-NMR measurement of the boron-containing compound (B-1) were as described above.

The results of $^1$H-NMR measurement of the boron-containing compound (B-1') were as follows.

$^1$H NMR (400 MHz, CDCl$_3$, r.t.): δ 0.99 (d, 3H, J=6.8 Hz), 1.24 (s, 12H), 1.65 (d, 3H, J=6.4, 2 Hz), 4.01 (sext, 1H, J=6.8 Hz), 5.18 (d, 1H, J=13.2 Hz), 5.22 (ddq, 1H, J=10.4, 9.2, 1.2 Hz), 5.35 (dq, J=10.4, 6.8, 1H), 6.20 (dd, 1H, J=13.2, 10.4 Hz).

Reference Example 1

A 1,4-diene skeleton-containing compound was synthesized through a boron-containing compound by the following method.

[Chemical Formula 20]

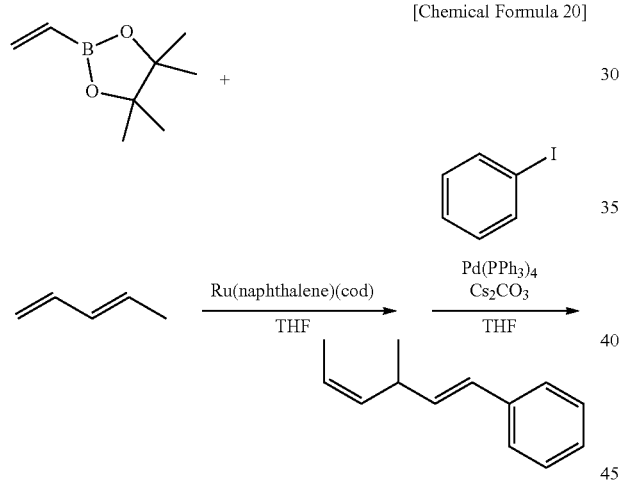

Specifically, vinylboronic acid pinacol ester (100 μL, 0.59 mmol) and 1,3-pentadiene (60 μL, 0.60 mmol) were dissolved in THF (4 mL), and [Ru(naphthalene) (cod)] (10.1 mg, 0.030 mmol) was added thereto. A reaction was performed at 30° C. for 3 hours. Cesium carbonate (385.9 mg, 1.184 mmol), Pd(PPh$_3$)$_4$ (35.0 mg, 0.030 mmol) and iodobenzene (65 μL, 0.59 mmol) were added thereto. A reaction was performed at 60° C. for 6 hours, so that a target compound was obtained at a yield of 81%. The results of $^1$H-NMR measurement of the compound obtained were as follows.

$^1$HNMR (400 MHz, CDCl$_3$, r.t.): δ 1.16 (d, 3H, J=6.3 Hz), 1.68 (dd, 3H, J=6.9, 1.7 Hz), 3.36 (sext, 1H, J=7.4 Hz), 5.33 (ddq, 1H, J=10.9, 9.2, 1.7 Hz), 5.50 (dq, 1H, J=10.9, 6.9 Hz), 6.17 (dd, 1H, J=16.0, 6.3 Hz), 6.36 (d, 1H, J=16 Hz), 7.18 (t, 1H, J=6.9 Hz), 7.29 (t, 2H, J=6.9 Hz), 7.35 (d, 2H, J=7.4 Hz).

It was confirmed from Reference Example 1 that the boron-containing compound according to the present invention is useful as a building block capable of introducing a 1,4-diene skeleton by a coupling reaction.

The invention claimed is:

1. A method for producing a boron-containing compound, comprising:
a step of reacting a first raw material compound represented by the following formula (I-1):

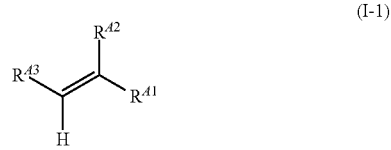

(I-1)

with a second raw material compound represented by the following formula (II-1):

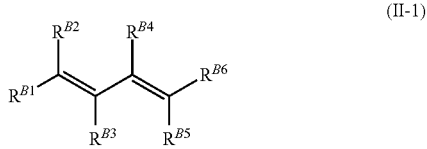

(II-1)

in the presence of a ruthenium catalyst to obtain a boron-containing compound represented by the following formula (III-1):

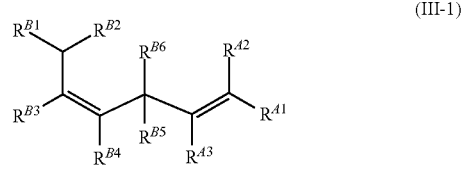

(III-1)

wherein $R^{A1}$, $R^{A2}$, $R^{A3}$, $R^{B1}$, $R^{B2}$, $R^{B3}$, $R^{B4}$, $R^{B5}$ and $R^{B6}$ each independently represent a hydrogen atom or a monovalent group, provided that at least one of $R^{A1}$, $R^{B1}$, $R^{B2}$, $R^{B3}$, RB4, RB5 and RB6 is a boron-containing group that binds to a binding target through a boron atom.

2. The production method according to claim 1, wherein $R^{A1}$ is a boron-containing group that binds to a binding target through a boron atom.

3. The production method according to claim 1, wherein $R^{B1}$ is a boron-containing group that binds to a binding target through a boron atom.

4. The production method according to claim 1, wherein at least one of $R^{B5}$ and $R^{B6}$; is a hydrogen atom.

5. The production method according to claim 1, wherein the metal catalyst is an asymmetric catalyst, and the boron-containing compound has optical activity.

6. A boron-containing compound represented by the following formula (III-1):

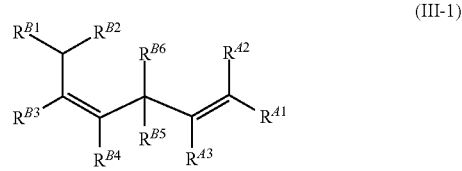

(III-1)

wherein $R^{A1}$ represents a monovalent group,
$R^{A2}$, $R^{A3}$, $R^{B1}$, $R^{B2}$, $R^{B3}$, $R^{B4}$, $R^{B5}$ and $R^{B6}$ each independently represent a hydrogen atom or a monovalent group,
provided that at least one of $R^{A1}$ and $R^{B1}$ is a boron-containing group that binds to a binding target through a boron atom,
wherein one of $R^{B5}$ and $R^{B6}$ is a hydrogen atom, and the other is a monovalent organic group or a halogeno group.

7. The boron-containing compound according to claim 6, wherein $R^{A1}$ is a boron-containing group that binds to a binding target through a boron atom.

8. The boron-containing compound according to claim 6, wherein $R^{B1}$ is a boron-containing group that binds to a binding target through a boron atom.

9. The boron-containing compound according to claim 6, wherein the boron-containing compound has optical activity.

10. A method for producing a boron-containing compound, comprising:
a step of reacting a first raw material compound represented by the following formula (I-1)

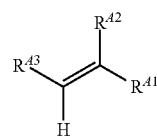

(I-1)

with a second raw material compound represented by the following formula (II-1):

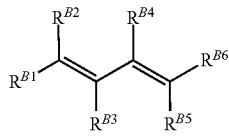

(II-1)

in the presence of a metal catalyst containing at least one selected from the group consisting of ruthenium and cobalt to obtain a boron-containing compound represented by the following formula (III-1):

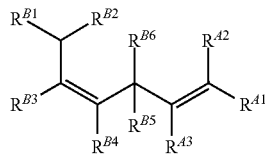

(III-1)

wherein $R^{A1}$, $R^{A2}$, $R^{A3}$, $R^{B2}$, $R^{B3}$, $R^{B4}$, $R^{B5}$ and $R^{B6}$ each independently represent a hydrogen atom or a monovalent group, and $R^{B1}$ is a boron-containing group that binds to a binding target through a boron atom.

11. A method for producing a boron-containing compound, comprising:
a step of reacting a first raw material compound represented by the following formula (I-1):

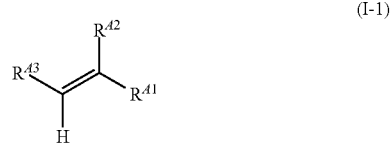

(I-1)

with a second raw material compound represented by the following formula (II-1):

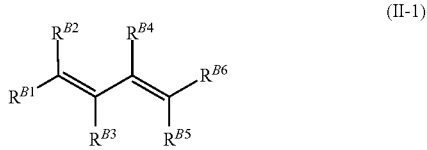

(II-1)

in the presence of a metal catalyst containing at least one selected from the group consisting of ruthenium and cobalt to obtain a boron-containing compound represented by the following formula (III-1):

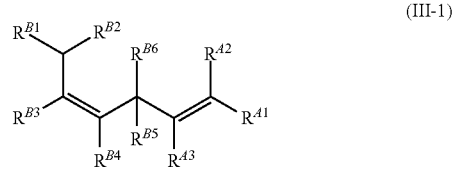

(III-1)

wherein $R^{A1}$, $R^{A2}$, $R^{A3}$, $R^{B1}$, $R^{B2}$, $R^{B3}$, $R^{B4}$, $R^{B5}$ and $R^{B6}$ each independently represent a hydrogen atom or a monovalent group, provided that at least one of $R^{A1}$, $R^{B1}$, $R^{B2}$, $R^{B3}$, $R^{B4}$, $R^{B5}$ and $R^{B6}$ is a boron-containing group that binds to a binding target through a boron atom,
wherein the metal catalyst is an asymmetric catalyst, and the boron-containing compound has optical activity.

* * * * *